(12) United States Patent
Naik

(10) Patent No.: US 9,215,282 B2
(45) Date of Patent: *Dec. 15, 2015

(54) VIRTUAL COLLABORATION SESSION ACCESS

(71) Applicant: Google Inc., Mountain View, CA (US)

(72) Inventor: Kiran Naik, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/317,213

(22) Filed: Jun. 27, 2014

(65) Prior Publication Data
US 2014/0317302 A1  Oct. 23, 2014

Related U.S. Application Data

(63) Continuation of application No. 13/360,968, filed on Jan. 30, 2012, now Pat. No. 8,788,680.

(51) Int. Cl.
*H04L 29/06* (2006.01)
*H04L 29/08* (2006.01)
*H04L 29/04* (2006.01)

(52) U.S. Cl.
CPC .......... *H04L 67/141* (2013.01); *H04L 65/1093* (2013.01); *H04L 67/306* (2013.01); *H04L 29/04* (2013.01); *H04L 29/0809* (2013.01); *H04L 29/08576* (2013.01)

(58) Field of Classification Search
CPC ... H04L 29/02; H04L 29/04; H04L 29/08576; H04L 29/0809; H04L 67/141; H04L 67/306; H04L 65/1069; H04L 65/1093; G06F 15/16; G06F 9/4451

See application file for complete search history.

(56) References Cited

U.S. PATENT DOCUMENTS

| 5,689,641 | A | 11/1997 | Ludwig et al. |
| 6,167,432 | A * | 12/2000 | Jiang .............................. 709/204 |
| 6,343,314 | B1 | 1/2002 | Ludwig et al. |
| 6,442,590 | B1 | 8/2002 | Inala et al. |
| 6,608,636 | B1 | 8/2003 | Roseman |
| 7,028,073 | B1 | 4/2006 | Bui et al. |
| 7,383,345 | B2 * | 6/2008 | Cinghita et al. .............. 709/231 |

(Continued)

OTHER PUBLICATIONS

TJN Chat Room—The Jazz Network Worldwide, found at http://www.thejazznetworkworldwide.com/groupitjnchatroonn, on Dec. 5, 2011, 15 pp.

(Continued)

*Primary Examiner* — Eleni Shiferaw
*Assistant Examiner* — Nelson Giddins

(57) ABSTRACT

Methods are provided that include receiving a request to couple a first client device to a communication session, wherein the request includes user identification information. The method may include determining a number of client devices coupled to the communication session and comparing the number of client devices coupled to the communication session to a maximum number of client devices to determine whether the maximum number of client devices are coupled to the communication session. The method may also include when the maximum number of client devices are coupled to the communication session, determining whether a user associated with the first client device is a preferred user based on at least the user identification information and when the user is the preferred user, coupling the client device associated with the preferred user to the communication session.

20 Claims, 5 Drawing Sheets

(56) References Cited

U.S. PATENT DOCUMENTS

| | | |
|---|---|---|
| 7,460,493 B1 | 12/2008 | Dhanoa et al. |
| 7,539,732 B2 | 5/2009 | Kelso et al. |
| 7,818,020 B1 | 10/2010 | Manroa et al. |
| 7,840,651 B2 | 11/2010 | Cinghita et al. |
| 8,438,226 B2* | 5/2013 | Kilmer et al. .............. 709/204 |
| 8,471,890 B1 | 6/2013 | Golas |
| 8,700,714 B1* | 4/2014 | Pan et al. .............. 709/206 |
| 8,788,680 B1* | 7/2014 | Naik .............. 709/227 |
| 2003/0164853 A1 | 9/2003 | Zhu et al. |
| 2003/0167304 A1 | 9/2003 | Zhu et al. |
| 2004/0090959 A1* | 5/2004 | Cinghita et al. .............. 370/390 |
| 2004/0111472 A1 | 6/2004 | Swanson et al. |
| 2005/0021624 A1* | 1/2005 | Herf et al. .............. 709/204 |
| 2005/0216847 A1 | 9/2005 | Zhu et al. |
| 2006/0039367 A1 | 2/2006 | Wright et al. |
| 2006/0045029 A1* | 3/2006 | Ethier et al. .............. 370/260 |
| 2006/0075029 A1* | 4/2006 | Kelso et al. .............. 709/206 |
| 2007/0081647 A1 | 4/2007 | Baker |
| 2007/0112918 A1 | 5/2007 | Berstis |
| 2007/0165608 A1 | 7/2007 | Attberg et al. |
| 2007/0168511 A1 | 7/2007 | Brochu et al. |
| 2007/0177604 A1 | 8/2007 | Ozawa et al. |
| 2007/0201659 A1 | 8/2007 | Attberg et al. |
| 2007/0233291 A1* | 10/2007 | Herde et al. .............. 700/91 |
| 2007/0250566 A1* | 10/2007 | Appelman et al. .............. 709/204 |
| 2008/0005657 A1 | 1/2008 | Sneh |
| 2008/0056256 A1 | 3/2008 | Cinghita et al. |
| 2008/0155087 A1* | 6/2008 | Blouin et al. .............. 709/223 |
| 2008/0222533 A1 | 9/2008 | Hankejh et al. |
| 2008/0260138 A1 | 10/2008 | Chen et al. |
| 2009/0088880 A1 | 4/2009 | Thapa |
| 2009/0089683 A1* | 4/2009 | Thapa .............. 715/756 |
| 2009/0253410 A1* | 10/2009 | Fitzgerald et al. .............. 455/411 |
| 2009/0280909 A1 | 11/2009 | McEniry |
| 2009/0325629 A1 | 12/2009 | Snyder |
| 2009/0327079 A1 | 12/2009 | Parker et al. |
| 2010/0046401 A1 | 2/2010 | Wright et al. |
| 2010/0088414 A1 | 4/2010 | Lin et al. |
| 2010/0124321 A1* | 5/2010 | Alexandrov et al. .... 379/202.01 |
| 2010/0157017 A1* | 6/2010 | Pepperell .............. 348/14.09 |
| 2010/0192072 A1 | 7/2010 | Spataro et al. |
| 2010/0250678 A1 | 9/2010 | Hu et al. |
| 2010/0332326 A1 | 12/2010 | Ishai |
| 2011/0066470 A1 | 3/2011 | Goyal et al. |
| 2011/0175923 A1 | 7/2011 | Mahajan et al. |
| 2011/0289157 A1 | 11/2011 | Pirnazar |
| 2011/0302105 A1 | 12/2011 | Yakubov |
| 2011/0314394 A1* | 12/2011 | Kilmer et al. .............. 715/755 |
| 2012/0004940 A1 | 1/2012 | O'Sullivan et al. |
| 2012/0078884 A1 | 3/2012 | Callari et al. |
| 2012/0084353 A1 | 4/2012 | Herde et al. |
| 2012/0101865 A1 | 4/2012 | Zhakov |
| 2012/0144416 A1* | 6/2012 | Wetzer et al. .............. 725/14 |
| 2013/0013778 A1* | 1/2013 | Herde et al. .............. 709/225 |
| 2013/0066974 A1* | 3/2013 | Yoakum et al. .............. 709/205 |
| 2013/0073389 A1 | 3/2013 | Heath |
| 2013/0117359 A1 | 5/2013 | Hussain et al. |
| 2013/0152221 A1 | 6/2013 | Yin et al. |
| 2013/0169742 A1* | 7/2013 | Wu et al. .............. 348/14.08 |
| 2013/0179941 A1* | 7/2013 | McGloin et al. .............. 726/3 |
| 2014/0006129 A1 | 1/2014 | Heath |

OTHER PUBLICATIONS

Stackoverflow, Implementing an Online Waiting Room, http://stackoverflow.com/questions/2669891/implementing-an-online-waiting-room, Apr. 19, 2010, 2 pp.

Davey Wavey Fitness, "Tonight: Davey Wavey LIVE for a Fitness-Themed Blog TV Show," published May 9, 2011, 11 pages. Internet site: http://www.daveywaveyfitness.com/tips/tonight-davey-wavey-live-for-a-fitness-themed-blogtv • show/. Retreived from internet on Feb. 13, 2012.

Levitt, J., "Fun with Amazon's Simple Queue Service," O'Reilly xml.com, Jan. 5, 2005, 9 pages. Internet site: http://www.xml.com/pub/a/2005/01/05/sqs.html?page=1. Retreived from internet on Feb. 13, 2012.

Final Rejection dated Aug. 4, 2014 for U.S. Appl. No. 13/300,499.

Non-Final Rejection dated Apr. 16, 2014 for U.S. Appl. No. 13/300,499.

Final Rejection dated Jan. 2, 2014 for U.S. Appl. No. 13/300,499.

Non-Final Rejection dated Aug. 2, 2013 for U.S. Appl. No. 13/300,499.

Notice of Allowance, dated Mar. 12, 2014, for related U.S. Appl. No. 13/360,968.

Final Rejection, dated Dec. 18, 2013, for related U.S. Appl. No. 13/360,968.

Notice of Allowance, dated Jul. 12, 2013, for U.S. Appl. No. 13/360,968.

Notice of Allowance, dated Feb. 10, 2015, for U.S. Appl. No. 13/300,499.

Notice of Allowance, dated May 26, 2015, for U.S. Appl. No. 13/300,499.

Notice of Allowance, dated Oct. 30, 2014, for U.S. Appl. No. 13/300,499.

* cited by examiner

VIRTUAL COLLABORATION SESSION ACCESS

CROSS-REFERENCE TO RELATED APPLICATIONS

This application is a continuation of U.S. application Ser. No. 13/360,968 filed Jan. 30, 2012, the disclosure of which is expressly incorporated herein by reference in its entirety.

TECHNICAL FIELD

This disclosure relates to computing devices and, in particular, computing device access to virtual collaboration sessions.

BACKGROUND

A user may socialize with his/her contacts by chatting, watching television or videos, playing games, or engaging in other activities with his/her contacts. In some instances, a user and his/her contacts may not be in the same physical location. Instead, the user and his/her contacts may rely on other mechanisms to socialize, such as talking on the phone, sending email, or text messaging.

SUMMARY

In one example, a method, executing on one or more computing devices, includes receiving, by the one or more computing devices, a request to couple a first client device to a communication session, where the request includes user identification information. The method may include determining, by the one or more computing devices, a number of client devices coupled to the communication session. The method may include comparing, by the one or more computing devices, the number of client devices coupled to the communication session to a maximum number of client devices to determine whether the maximum number of client devices are coupled to the communication session. The method may include when the maximum number of client devices are coupled to the communication session, determining, by the one or more computing devices, whether a user associated with the first client device is a preferred user based on at least the user identification information. The method may include when the user is the preferred user, coupling, by the one or more computing devices, the client device associated with the preferred user to the communication session, wherein the communication session enables communication between the first client device and one or more second client devices coupled to the communication session.

In another example, a non-transitory computer-readable storage medium comprising instructions that, when executed, cause one or more processors of one or more computing devices to perform operations. The operations may include receiving a request to couple a first client device to a communication session, where the request includes user identification information. The operations may include determining a number of client devices coupled to the communication session. The operations may include comparing the number of client devices coupled to the communication session to a maximum number of client devices to determine whether the maximum number of client devices are coupled to the communication session. The operations may include when the maximum number of client devices are coupled to the communication session, determining whether a user associated with the first client device is a preferred user based on at least the user identification information. The operations may include when the user is the preferred user, coupling the client device associated with the preferred user to the communication session, wherein the communication session enables communication between the first client device and one or more second client devices coupled to the communication session.

In another example, a server includes one or more computing devices, the one or more computing devices being configured to perform a method. The method may include receiving, by the one or more computing devices, a request to couple a first client device to a communication session, where the request includes user identification information. The method may include determining, by the one or more computing devices, a number of client devices coupled to the communication session. The method may include comparing, by the one or more computing devices, the number of client devices coupled to the communication session to a maximum number of client devices to determine whether the maximum number of client devices are coupled to the communication session. The method may include when the maximum number of client devices are coupled to the communication session, determining, by the one or more computing devices, whether a user associated with the first client device is a preferred user based on at least the user identification information. The method may include when the user is the preferred user, coupling, by the one or more computing devices, the client device associated with the preferred user to the communication session, wherein the communication session enables communication between the first client device and one or more second client devices coupled to the communication session.

The details of one or more embodiments are set forth in the accompanying drawings and the description below. Other features, objects, and advantages will be apparent from the description and drawings, and from the claims.

Figure 1:
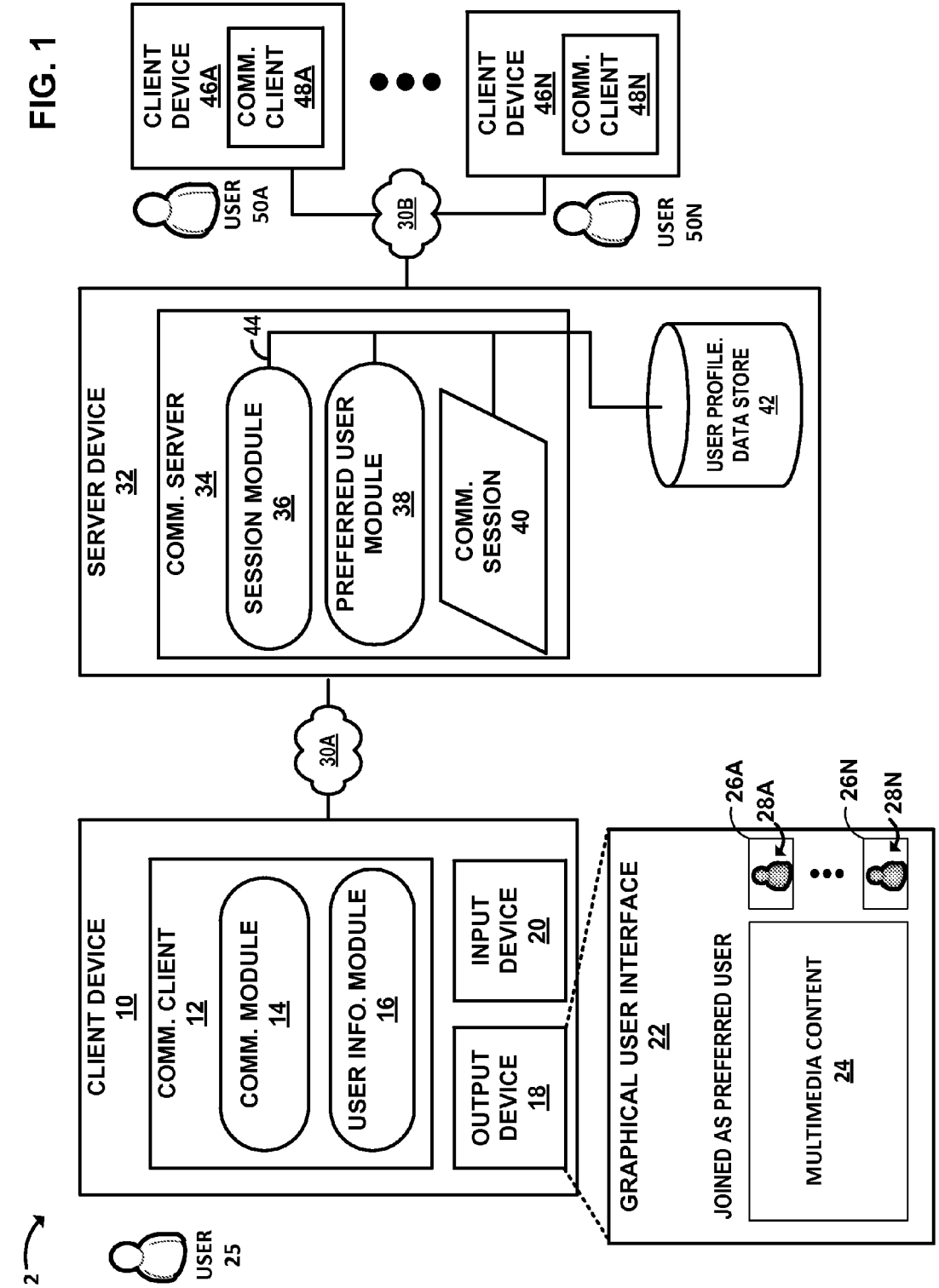
FIG. 1 is a block diagram illustrating an example of a communication system in which one or more client devices are coupled to a server device that enables communication between users, in accordance with one or more aspects of the present disclosure.

The details of one or more aspects of this disclosure are set forth in the accompanying drawings and the description below. Other features, objects, and advantages of the disclosure will be apparent from the description and drawings, and from the claims.

DETAILED DESCRIPTION

Overview

Friends, colleagues or other individuals who wish to socialize or otherwise communicate may be dispersed geographically. When dispersed geographically, some individuals may rely upon telephony, text messaging, email, or other forms of communication that support limited forms of socializing. However, these forms of communication may not provide participants an experience comparable to socializing in person. Instead, users in different geographical locations may socialize in a shared virtual space (e.g., engage in a "virtual collaboration session"). A virtual collaboration session may enable multiple users to share and watch videos, share and listen to audio streams, play games, participate in video and/or audio chat, collaboratively browse the Internet, or combinations thereof. The virtual collaboration session may provide an experience that may be comparable to socializing in person. Techniques of this disclosure may enable the creation of the virtual collaboration session that may mirror the experience of individuals socializing in the same physical location.

In one aspect of the present disclosure, the virtual collaboration session may be provided using a communication session. A "communication session" as used herein is a broad term encompassing as its plain and ordinary meaning, including but not limited to, one or more objects, which may be stored in and/or are executable by hardware that may enable communication clients coupled to the one or more objects to exchange information. The one or more objects may include data and/or provide functionality of a communication session as described herein.

Communication sessions may enable users associated with client devices coupled to the communication session to communicate (e.g., engage in a virtual collaboration session). Users of a communication session may contemporaneously watch videos, communicate, and play games with the other users of the communications session. In some examples, the communication session may enable communication between users by exchanging both audio and visual information between client devices coupled to the communication session. For example, the communication session may enable audio data and video data of users of the in the communication session to be received by client devices coupled to the communication session in order to create a shared experience similar to sitting in a room together.

In some instances, due to at least one of network and/or computing device resource constraints and user preferences, communication sessions may have a maximum number of client devices that may simultaneously participate in a communication session. That is, a maximum number of client devices that are coupled to a communication session. For example, the network and/or computing device resources may set a maximum number of users to maintain a level of performance of the communication session. In other examples, a user initiating a communication session may define a maximum number of client devices able to couple to the communication session.

In previous examples, if a user sends a request to join a communication session that has the maximum number of client devices, the user may be sent a notification informing the user that the communication session is full and that the request to join is denied. The user may repeatedly send the request to join the communication session, but will be granted access only when one or more of the client devices exit the full communication session (e.g., decoupled from the communication session). That is, the user will be granted access when the request to join the communication session is received when the number of client devices is fewer than the maximum number of client devices.

However, socializing opportunities may be missed if preferred users are not allowed to join a communication session because the communication session is full (e.g., has the maximum number of users). For example, if a communication session is dedicated to discussing a new movie, book, or piece of art, and the actor/actress author, and/or artist of the movie, book, or piece of art would like to join the communication session, he/she would only be able to join if fewer than the maximum number of client devices were connected to the communication session.

In general, aspects of the present disclosure are directed to techniques that may enable a client device associated with a preferred user to join a communication session when the communication session has the maximum number of client devices. For instance, techniques of the disclosure may receive a request to join a communication session from a client device that includes user identification information. A communication server that implements techniques of the disclosure may determine whether a maximum number of client devices are joined to the communication session, and if so, determine whether a user associated with the client device is a preferred user based on at least the user identification information. As discussed herein, if the user is determined to be a prefer user, the communication server may connect the client device associated with the preferred user to the communication session.

As used throughout this disclosure, headings are included to improve the clarity of the disclosure and are not used to define separate embodiments. In some examples, features of various embodiments may be combined and/or used from among multiple headings in accordance with aspects of the present disclosure.

Example System

FIG. 1 is a block diagram illustrating an example of a communication system 2 in which one or more client devices 10, 46A-N are coupled to a server device 32 that enables communication between users associated with client device 10, 46A-N, in accordance with one or more aspects of the present disclosure. Client device 10 may include output device 18, input device 20, and communication client 12, which further includes communication module 14 and user information module 16. Client devices 46A-N (collectively "client devices 46") may be a client device similar to client device 10 that includes some, all, and/or different functionality than the functionality provided by communication client 12, communication module 14, and user information module 16.

As illustrated in FIG. 1, server device 32 includes communication server 34, which includes session module 36, preferred user module 38, and communication session 40. Each of client devices 10, 46 and server device 32 may be operatively coupled by communication channels 30A-B (collectively "communication channels 30"), which in some examples may be wired or wireless communication channels capable of sending and receiving data. Server device 32 may include communication server 34 that maintains one or more communication sessions such as communication session 40. As illustrated in FIG. 1, client device 10 and client devices 46 may communicate with server device 32 via communication channels 30. That is, client device 10 and client devices 46 may be operatively and/or communicatively coupled by communication channels 30 to server device 32. Communication channels 30, in some examples, may be wired or wireless communication channels capable of sending and receiving data. One example of communication channels 30 may include a Transmission Control Protocol and/or Internet Protocol (TCP/IP) network connection.

Client devices 10, 46 may be operatively coupled to a communication session 40 that enables communication between user 25 associated with client device 10 and users 50A-N (collectively "users 50") associated with client devices 46. Examples of client devices 10, 46, may include, be, or be part of a mobile computing device (e.g., a mobile phone, netbook laptop, personal digital assistant (PDA), tablet computer, portable gaining device, portable media player, e-book reader, or watch), other computing devices (e.g., a desktop computer, or set top box), or televisions with one or more processors embedded therein or attached thereto. Client devices 10, 46 may be the same or different types of devices. For example, client device 10 and client device 46A may both be mobile phones. In another example, client device 10 may be a mobile phone and client device 46A may be a desktop computer.

Client device 10 may include one or more output devices (e.g., output device 18). Examples of output device 18 may include a video graphics card, a computer display, a sound card, and speakers. Client device 10 may also include one or more input devices (e.g., input device 20). Input device 20 may include keyboards, pointing devices, microphones, and cameras capable of recording one or more images or video.

Client device 10 of FIG. 1 may include communication client 12. In some examples, communication client 12 may include mobile or types of software applications that provide functionality described herein. Communication client 12 may include various modules, such as a communication module 14 and user information module 16, as illustrated in FIG. 1. Communication client 12 may exchange audio, video, text, or other information with other communication clients coupled to communication session 40 (e.g., communication clients 48A-C (collectively "communication clients 48")).

Communication module 14 may cause output device 18 to display graphical user interface (GUI) 22. Communication module 14 may further include functionality that enables communication client 12 to couple to communication server 34 and communicatively couple to one or more communication sessions (e.g., communication session 40). Two or more client devices (e.g., client device 110 and client devices 46) may communicatively couple to the same communication session to enable communication between users of the client devices (e.g., user 25 and users 50). As described throughout this disclosure, a user may "join" or "connect" to a communication session when the communication client of the user's computing device couples (e.g., establishes a connection, to a communication server executing on a server device and/or client device). In some examples, a communication client executing on a client device joins a communication session by communicatively coupling to a communication session managed by a communication server executing on a server device and/or client device.

Communication client 12 may also include user information module 16 that enables communication module 14 to send user identification information corresponding to user 25 associated with client device 10. As discussed herein, communication module 14 may generate a request to couple to communication session 40 and send the request to communication server 34. User information module 16 may enable communication module 14 to send user identification information associated with user 25 in the request. In some examples, the user identification information may be sent to communication server 34 prior to communication client 12 sending the request or after communication client 12 has sent the request. In some examples, user identification information may include an identifier of the client device that sent the request and an identifier of the user associated with client device that sent the request. For example, user identification information may include an identifier of client device 10 and an identifier of user 25 (e.g., a user profile identifier) associated with client device 10.

As illustrated in FIG. 1, server device 32 includes communication server 34 and user information data store 44. Communication server 34, as shown in FIG. 1, may perform one or more operations that enable a user to participate in a virtual collaboration session with at least one other user to socialize. Examples of server device 32 may include a personal computer, a laptop computer, a television with one or more processors embedded therein or coupled thereto, a handheld computer, a workstation, a data storage system, a supercomputer, or a mainframe computer. Communication server 34 may generate, manage, and terminate communication sessions such as communication session 40. In some examples, communication server 34 may include one or more modules executing on one or more computing devices, such as server device 32, that performs operations described herein.

As illustrated in FIG. 1, communication server 34 may include components such as session module 36, preferred user module 38, and communication session 40. Communication server 34 may also include components such as user profile data store (UPD) 42. Components of communication server 34 may be physically communicatively and/or operatively coupled by communication channel 44. Examples of communication channel 44 may include a system bus, inter-process communication data structures, and/or a network connection.

In accordance with one or more techniques of the present disclosure, client devices associated with preferred users may join communication sessions having the maximum number of client devices coupled to the communication session (e.g., at maximum capacity). For example, if a maximum number of client devices are coupled to communication session 40, communication client 12 of client device 10 may couple to communication session 40 if it is determined that user 25 associated with client device 10 is a preferred user.

As discussed herein, the maximum number of client devices may be based on at least one of network and/or computing device resource constraints and user preferences. In some examples, the maximum number of client devices may be based on network and/or computing device resources in order to maintain a minimum level of performance of the communication session. In other examples, the maximum number of client devices may be configurable. For example, a user (e.g., a user associated with a client device that initiated the communication session) may define the maximum number of client devices able to join the communication session. In some examples, the maximum number of client devices may be within a range of from two to twenty client devices. In other examples, the maximum number of client devices may be ten client devices. In other examples, the maximum number of client devices may be set by an administrator of server device 32. The administrator of server device 32 may set the maximum number of client devices to any number of client devise.

As discussed herein, socializing opportunities may be missed if preferred users are not allowed to join a communication session because the communication session is full (e.g., has the maximum number of client devices). For example, users 50A-N may participate in communication session 40, where N is the maximum number of client devices that may be coupled to communication session 40. In some examples, if user 25 associated with client device 10 attempts to join communication session 40 when the maximum number of client devices are coupled to communications session

40, user 25 is typically first authenticated as a preferred user before client device 10 is permitted to couple to communication session 40.

In some examples, a client device may couple to a waiting room for a full communication session (e.g., a communication session having the maximum number of client devices). The waiting room may include a queue of client devices that have sent a request to join the communication session having the maximum number of client devices. In one example, client device 10 may couple to the waiting room until user 25 is determined to be a preferred user. In another example, a client device associated with a non-preferred user may couple to the waiting room and be placed into the queue. The client device associated with the non-preferred user may be coupled to the communication session when the client device is first in the queue and fewer than the maximum number of client devices are coupled to the communication session.

In one example, a communication session (e.g., communication session 40) may be discussing, for example, a book named "Book A". If user 25 is the author of Book A and attempts to join communication session 40 when the maximum number of client devices are coupled to communication session 40, user 25 will be denied access because the maximum number of client devices (e.g., 10, 20 etc.) are coupled to communication session 40. However, aspects of this disclosure enable a preferred user to join a communication session when the maximum number of client devices are coupled to the communication session. For example, if user 25 associated with a client device 10 is determined to be a preferred user, communication client 12 may couple to communication session 40, such that client device 10 is the N+1 client device, where N is the maximum number of client devices. For example, if "N" is 10 client devices, client device 10 associated with user 25 may be the client device coupled to communication session 40. As used herein, "a preferred user" refers to a user that is granted access to a communication session that has the maximum number of client devices where a regular user would not be granted access.

In some examples, session module 36 may receive a request from client device 10 to join communication session 40. As discussed herein, the request may include user identification information. For example, the user identification information may include an identifier of the client device that sent the request (e.g., client device 10) and an identifier of a user associated with the client device that sent the request (e.g., user 25 associated with client device 10). Session module 36 may determine the number of client devices coupled to communication session 40. For example, session module 36 may compare the number of client devices coupled to communication session 40 to the maximum number of client devices to determine whether the maximum number of client devices are currently coupled to communication session 40.

In response to the maximum number of client devices being coupled to communication session 40, session module 36 may determine whether user 25 is a preferred user based at least in part on the user identification information. For example, session module 36 may send a message including the user identification information to preferred user module 38 to indicate that a request to join a full communication session was received. In some examples, preferred user module 38 may use the user identification information to query UPD 42 to retrieve user status information for user 25 associated with client device 10. Preferred user module 38 may determine a user status of user 25 based at least in part on the retrieved user status information, In some examples, the user status is one of a preferred user and a non-preferred user. That is, preferred user module 38 may determine that user 25 is a preferred user based on the user status information stored in UPD 42. UPD 42 may include any suitable data structure to store information such as a database, lookup table, array, linked list, etc.

As illustrated in FIG. 1, LTD 42 may include information associated with users. For example, UPD 42 may include user identifiers that identify a particular user and corresponding user profile information (e.g., user status information). In one example, the user identification information included in the request may be compared to user identifiers to identify the user requesting to join a communication session. The user profile information corresponding to the identified user may include any fact, classifier, or other information that may be related to the user. In one example, the user profile information includes a user status, where the user status indicates that the user is one of a preferred user and a non-preferred user.

In some examples, the preferred user may have a verified preferred status. That is, the user is determined to be a preferred user based on at least a verified preferred status. For example, a social network service provider associated with the communication session may verify a preferred status of a user such that the user has a verified preferred status. In this example, a celebrity and/or public figure may request a verified preferred status from the social network service provider associated with the communication session. Once the user is authenticated as being the celebrity or public figure, the UPD 42 may be updated such that a user profile of the celebrity and/or public figure includes the verified preferred status. The verified preferred status may enable the preferred user to join a communication session that currently has the maximum number of client devices connected to the communication session.

In other examples, the preferred user may have a granted preferred status. The granted preferred status may be given to users whose participation in virtual collaboration sessions exceeds a threshold or is otherwise outstanding relative to other users. For example, the social network service provider associated with the communication session may grant a user the granted preferred user status to users based on at least one of a number of connections to communications sessions, an activity level, and contests. For example, the number of connections may be a usage history of users. That is, the usage history of users may be monitored and stored in UPD 42, such that users having a determined number of connections over a period of time may be assigned the granted preferred status. In other examples, an activity level of users participating in virtual collaboration sessions may be monitored. For example, a number of times a user initiates a communication session and/or a number of posts made while connected to a communication session may be monitored. In other examples, users may enter various contests to win a preferred user status. For example, a social network service provider hosting the communication sessions may have contents in which users may participate to win the granted preferred status.

In some examples, the granted preferred status may have a limited duration. The limited duration may be based on a determined time limit. For example, a user may have the granted preferred status for a set period of time (e.g., 1 month). Additionally, the limited duration may be based on a threshold number of connections to communication sessions. That is, once the number of connections per set period of time decreases below a threshold, the granted preferred status may be terminated.

In some examples, upon determining that a user is a preferred user, a client device associated with the preferred user may be coupled to a communication session. For example, once user 25 is determined to be a preferred user, client device 10 may be coupled to communication session 40. In this example, client devices 46A-N are coupled communication session 40 when client 10 is coupled to communication session 40, where "N" is the maximum number of client devices. In other examples, session module 36 may determine that fewer than the maximum number of client devices are coupled to communication session 40. In that instance, regardless of whether user 25 is a preferred user or a non-preferred user, client device 10 may couple to communication session 40.

In some examples, more than one preferred user may join a communication session (e.g., communication session 40) when the maximum number of client devices are coupled to the communication session. For example, if another client device associated with a preferred user joined communication session 40, the number of client devices coupled to communication session would be N+2. "N" is the maximum number of client devices and "2" is the number of client devices associated with preferred users that joined communication session 40 once the maximum number of client devices were coupled to communication session 40. In some examples, the communication session may have a maximum number of client devices associated with preferred users. In that instance, the number of client devices coupled to the communication session may be expressed as "N+M", where "N" is the maximum number of client devices coupled to the communication session and "M" is the maximum number of client devices associated with preferred users that can join the communication session when there are "N" client devices coupled to the communication session.

In some examples, the maximum number of client devices (e.g., "N") may include client devices associated with preferred and non-preferred users. That is, if a client device associated with a preferred user joins a communication session when there are fewer than the maximum number of client devices, the maximum number of client devices that may couple to the communication session is still "N". For example, if the maximum number of client devices communication session is ten, and there are eight client devices associated with non-preferred users and one client device associated with a preferred user coupled to the communication session, then only one more client device associated with either a non-preferred user and/or a preferred user may join the communication session. Once the maximum number of client devices are coupled to the communication session, only client devices associated with preferred users may join the communication session.

In other examples, the maximum number of client devices (e.g., "N") is only refers to client devices associated with non-preferred users. For example, if the maximum number of client devices for a communication session is ten, and there are eight client devices associated with non-preferred users and two client devices associated with preferred users coupled to the communication session, then two more client device associated with non-preferred users may join the communication session. Once the maximum number of client devices (e.g., client devices associated with non-preferred users) are coupled to the communication session, only client devices associated with preferred users may join the communication session.

Session module 36 may create, manage, and terminate communication sessions, such as communication session 40. For instance, session module 36 may receive a request from a client device to initiate a communication session (e.g., communication session 40). In response to receiving the request to create a communication session, session module 36 may create a communication session and couple the client device to the communication session. As discussed herein, the request to initiate the communication session may also include the maximum number of client devices for the communication session. For example, client device 46A associated with user 50A may send a request to initiate communication session 40 to session module 36, which may include the maximum number of client devices that may couple to communication session.

Session module 36 may also terminate communications sessions, such as communication session 40. In some examples, users associated with client devices coupled to a communication session 40 may provide input to exit the communication session. For example, users 25, 50 may provide input to exit communication session 40. In response to receiving the input to exit, communication clients may send a control message to session module 36 to decouple the client device from the communications session. For example, user 25 may provide input to exit communication session 40. In response to receiving the input, communication client 12 may send a control message to session module 36 to decouple client device 10 from communication session 40. In this instance, communication clients 48 may remain coupled to communication session 40.

In other examples, a user associated with the client device that initiated the communication session may also provide input to terminate the communication session. For example, if client device 46A initiated communication session 40, user 50A may provide input to either exit communication session 40 or to terminate communication session 40. In response to user 50A providing input to terminate communication session 40, communication client 48A may send a control message to session module 36 to terminate communication session 40. In some examples, terminating communication session 40 may decouple all client devices coupled to communication session 40. That is, client devices 10 and 46A-C may be decoupled from communication session 40 by session module 36.

As discussed herein, in response to determining communication session 40 is full and that user 25 is a preferred user, session module 36 may send a message to communication client 12 enabling client device 10 to couple to communication session 40. Additionally, in response to receiving a request from a user to join communication session 40 and determining that fewer than the maximum number of client devices are coupled to communication session 40, session module 36 may send a message to communication client 12 enabling client device 10 to couple to communication session 40.

Once client device 10 is connected to communication session 40, user 25 and users 50 may communicate. In some examples, multiple protocols may be used by session module 36 to couple client devices to communication session 40. For instance, client devices 10, 50 may couple to server device 32 using a first protocol while session module 36 and preferred user module 38 may communicate using a second protocol. Communication server 34 may apply protocol translation techniques to enable communication between different protocols.

When coupled to communication session 40, communication client 12 may cause output device 18 to display GUI 22. GUI 22 may include graphical elements such as video feeds 26A-N (collectively referred to as "video feeds 26"), visual representations 28A-N (collectively referred to as "visual representations 28"), and multimedia content 24. Additionally, as illustrated FIG. 1, GUI 22 may display that user 25 is "Joined as Preferred User". That is, user 25 is a preferred user and has joined a communication session (e.g., communication session 40) that has the maximum number of client devices.

Video feeds 26 may include visual representations 28 of other users communicating via communication session 40. For example, video feed 26A may include visual representation 28A of user 50A who is communicating via communication session 40. In some examples, communication clients 48 may send video feeds to communication server 34, which may determine that communication client 12 is coupled to communication session 40. Consequently, communication server 34 may send the video feeds of users 50 to communication client 12. Communication client 12, upon receiving the video feeds, may cause output device 18 to display the video feeds as video feeds 26.

In some examples, communication client 12 may further cause input device 20 to generate a video feed of user 25, which may be similarly sent in a video feed to communication clients 48. Additionally, communication client 12 may further cause output device 18 to display the video feed generated by input device 20 within video feeds 26. In this way, user 25 may view video data of him or herself along with video data of users associated with client devices coupled to communication session 40.

In addition to exchanging video information (e.g., video data), user 25 and users 50 may exchange audio via communication session 40. For instance, microphones (e.g., input devices) may capture sound at or near each of client devices 10, 46 (e.g., voices of user 25 and users 50). Audio data generated by communication clients from the sound, may be exchanged between the communication clients coupled to communication session 40. For instance, if user 25 speaks, input device 20 may receive the sound and convert it to audio data. Communication client 12 may then send the audio data to communication server 34. Communication server 34 may determine communication clients 48 are coupled to communication session 40, and upon determining that communication clients 48 are coupled to communication session 40, communication server 34 may send the audio data to communication clients 48. After receiving the audio data, output devices (e.g., sound cards and/or speakers associated with client devices 46) may output sounds based at least in part on the audio data.

In still other examples, text, such as real-time instant messages, or files may be exchanged between communication client 12 and communication clients 48 using similar techniques. As seen in FIG. 1, in addition to displaying video feeds 26, communication client 12 may cause output device 18 to display multimedia content 24 within GUI 22. In some examples, multimedia content 24 may include one or more documents, files, images, animations, videos, or other graphical representations. In other examples, multimedia content 24 may include sound, voice, or other audio data. In still other examples, multimedia content 24 may include a combination of graphical representations and audio data. In some examples, a client device coupled to communication session 40 may generate a graphical representation of all or a portion of a graphical user interface generated by the client device. The graphical user interface may then be shared with other client devices coupled to the communication session thereby enabling other client devices to display the graphical representation of the graphical user interface.

In the example of FIG. 1, multimedia content 26 may be output by each client device 10 and 46A-N contemporaneously using communication clients 12 and 48A-N, respectively. In this way, user 25 and users 50 may simultaneously view and/or hear multimedia content 24. In some examples, multimedia content 24 may be selected by only a subset of users associated with client devices coupled to communication session 40. In other examples, all users associated with client devices coupled to communication session 40 may select multimedia content that will be output contemporaneously at each client device coupled to communication session 40. In some examples, multimedia content 24 being output to user clients coupled to communication session 40 may be different.

Techniques of the present disclosure may include one or more advantages. For example, enabling preferred users to join otherwise full communication sessions may increase the experience of the virtual collaboration session. Therefore, a number of missed socializing opportunities may be reduced by enabling the preferred users to join full communication sessions. Additionally, in examples of where the preferred user has a verified preferred status, other users participating in the virtual collaboration session may have confidence that the preferred user is who they purport to be.

Example Device

Figure 2:
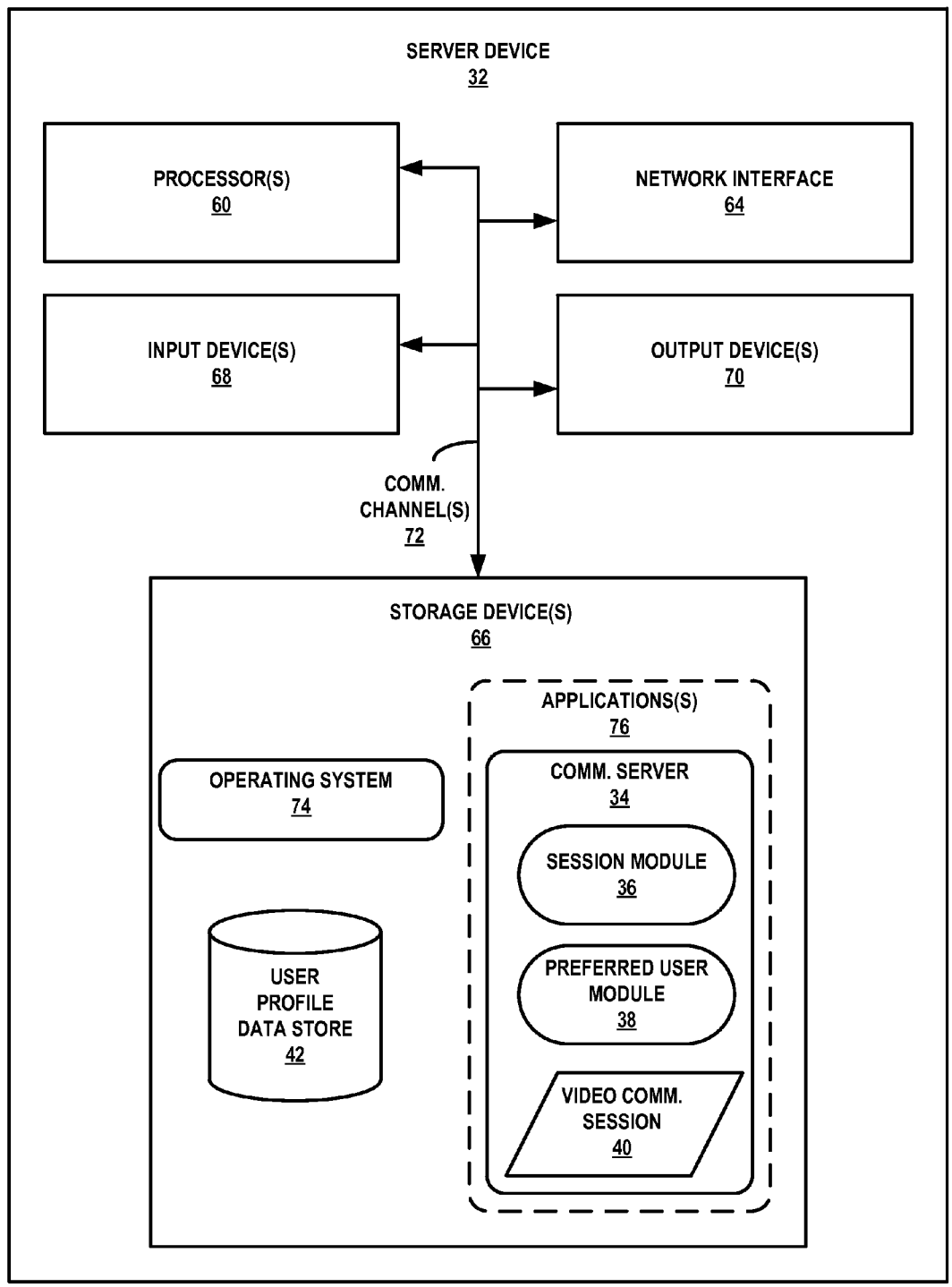
FIG. 2 is a block diagram illustrating further details of one example of a server device 32 shown in FIG. 1, in accordance with one or more aspects of the present disclosure.

FIG. 2 is a block diagram illustrating further details of one example of a server device 32 shown in FIG. 1, in accordance with one or more aspects of the present disclosure. FIG. 2 illustrates only one particular example of server device 32, and many other example embodiments of server device 32 may be used in other instances.

As shown in the specific example of FIG. 2, server device 32 includes one or more processors 60, a network interface 64, one or more storage devices 66, input device 68, and output device 70. Server device 32 also includes an operating system 74 that is executable by server device 32. Server device 32, in one example, further includes communication server 34 that is also executable by server device 32. Each of components 60, 64, 66, 68, and 70, may be interconnected (physically, communicatively, and/or operatively) by communication channels 72 for inter-component communications.

Processors 60, in one example, are configured to implement functionality and/or process instructions for execution within server device 32. For example, processors 60 may be capable of processing instructions stored in memory 62 or instructions stored on storage devices 66.

Server device 32, in some examples, also includes a network interface 64. Server device 32, in one example, utilizes network interface 64 to communicate with external devices via one or more networks, such as one or more wireless networks. Network interface 64 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, server device 32 utilizes network interface 64 to wirelessly communicate with an external device such as client devices 10, 46 of FIG. 1.

Server device 32, in one example, also includes one or more input devices 68. Input device 68, in some examples, is configured to receive input from a user through tactile, audio, or video feedback. Examples of input device 68 include a presence-sensitive screen, a mouse, a keyboard, a voice responsive system, video camera, microphone or any other type of device for detecting a command from a user.

One or more output devices 70 may also be included in server device 32. Output device 70, in some examples, is configured to provide output to a user using tactile, audio, or video stimuli. Output device 70, in one example, includes a presence-sensitive screen, a sound card, a video graphics adapter card, or any other type of device for converting a signal into an appropriate form understandable to humans or machines. Additional examples of output device 70 include a speaker, a cathode ray tube (CRT) monitor, a liquid crystal display (LCD), or any other type of device that can generate intelligible output to a user.

Storage devices 66, in some examples, also include one or more computer-readable storage media. Storage devices 66 may be configured to store larger amounts of information than memory 62. Storage devices 66 may further be configured for long-term storage of information. In some examples, storage devices 66 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

In some examples, storage devices 66 may also include memory. Memory may be described as a computer-readable storage medium. In some examples, memory is a temporary memory, meaning that a (primary purpose of memory is not long-term storage. Memory, in some examples, is described as a volatile memory, meaning that memory does not maintain stored contents when the computer is turned off. Examples of volatile memories include random access memories (RAM), dynamic random access memories (DRAM), static random access memories (SRAM), and other forms of volatile memories known in the art. In some examples, memory is used to store program instructions for execution by processors 60. Memory, in one example, is used by software or applications running on server device 32 (e.g., applications 76) to temporarily store information during program execution.

Server device 32 may include operating system 74. Operating system 74, in some examples, controls the operation of components of server device 32. For example, operating system 74, in one example, facilitates the interaction of one or more applications 76 (e.g., communication server 34) with processors 60, network interface 64, storage device 66, input device 68, and output device 70. As shown in FIG. 2, server device 32 may include communication server 34 and user profile data store 42. Communication server may include session module 36, preferred user module 38, and communication session 40, as described in FIG. 1. Applications 76, communication server 34, session module 36, preferred user module 38, and communication session 40 may each include program instructions and/or data that are executable by server device 32. For example, session module 36 and preferred user module 38 may include instructions that cause server device 32 to perform one or more of the operations and actions described in the present disclosure. Although not shown, each of components 74, 72, 76, and 32, may be interconnected (physically, communicatively, and/or operatively) by communication channels for inter-component communications.

In accordance with aspects of the present disclosure, session module 36 may receive a request to join a communication session via network interface 64. The request may be received from communication client 12 by network interface 64 and specify the communication session (e.g., communication session 40). Session module 36 may determine a number of client devices coupled to communication session 40. Session module 36 may then compare the number of client devices coupled to communication session 40 to a maximum number of client devices to determine whether the maximum number of client devices are coupled to communication session 40. Responsive to determining the communication session 40 has the maximum number of client devices, session module 36 may send a message to preferred user module 38 including user identification information provided in the request. Responsive to receiving the message, preferred user module 38 may query user profile data store 42 to determine whether user 25 is a preferred user. In response to preferred user module 38 determining user 25 is a preferred user, preferred user module 38 may send a message to session module 36 indicating that user 25 is a preferred user. Consequently, session module 36 may send a message to client device 10 (associated with user 25) that initially sent the request via network interface 64. The message may include information that enables communication client 12 executing on client device 10 to couple to communication session 40, thus making the number of client devices coupled to communication session 40 "N+1", where N is the maximum number of client devices. In this way preferred users may join communication sessions that are full (e.g., have the maximum number of client devices).

Example Process

Figure 3:
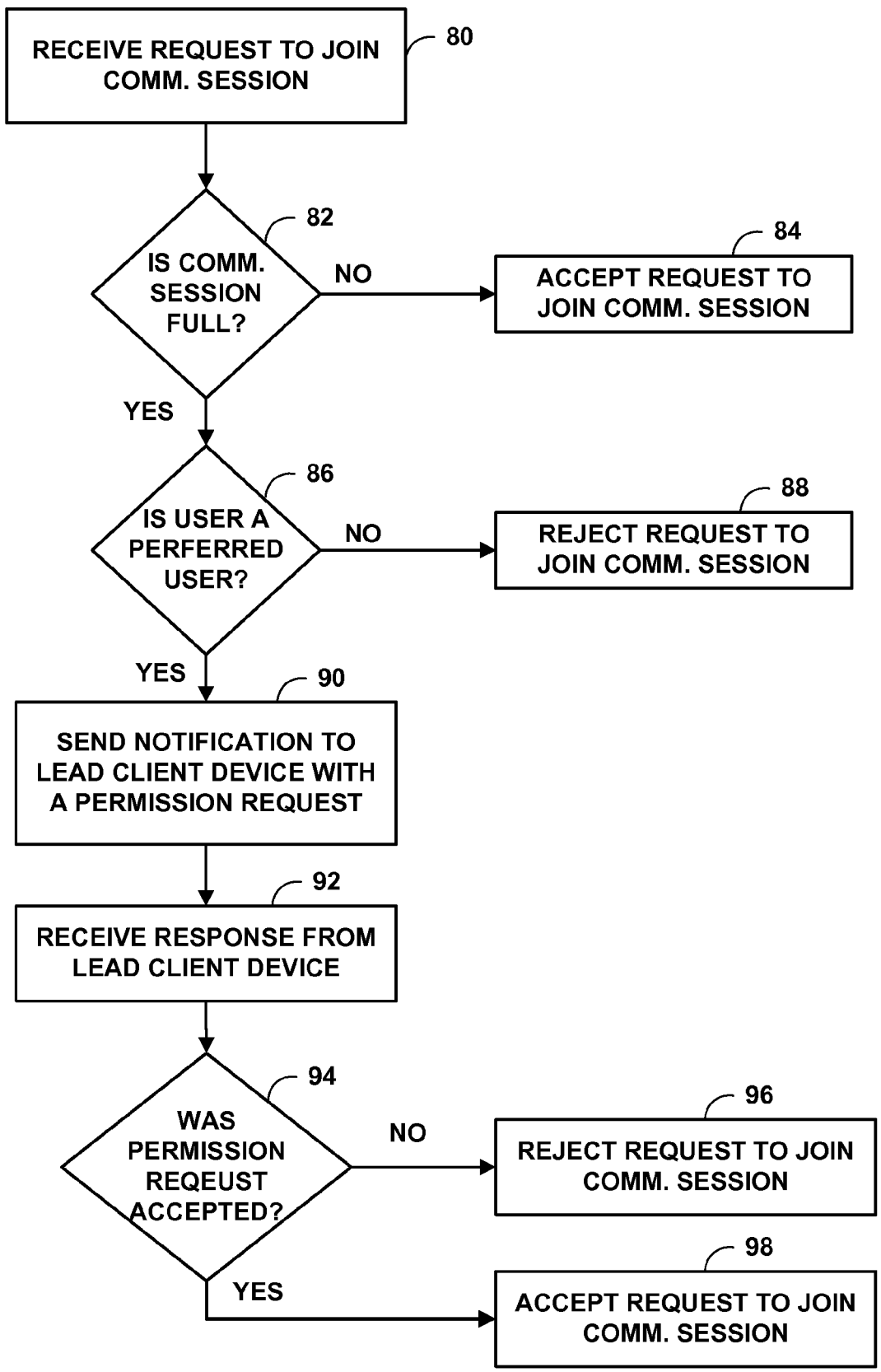
FIG. 3 is a flow diagram illustrating an example process for joining a client device to a communication session, in accordance with one or more aspects of this disclosure.

FIG. 3 is a flow diagram illustrating an example process for joining a client device to a communication session, in accordance with one or more aspects of this disclosure. For purposes of illustration only, the example process is described below within the context of communication server 34 of server device 32 as shown in FIG. 1.

In one example, communication server 34 may receive request to join a communication session (80). For example, communication server 34 may receive a request to join communication session 40 from client device 10 as described herein with respect to FIG. 1. In response to receiving request from client device 10, communication server 34 may determine whether communication session 40 is full (82). For example, communication server 34 may determine whether a maximum number of client devices are coupled to communication session 40 as described herein with respect to FIG. 1. If there is fewer than the maximum number of client devices coupled to communication session 40 ("NO" branch of 82), communication server 34 may accept the request to join client device 10 to communication session 40 (84). For example, session module 36 may send a message to client device 10 enabling communication client 12 to couple to communication session 40.

If the maximum number of client devices are coupled to communication session 40 ("YES" branch of 82), communication server 34 may determine whether user 25 associated with client device 10 is a preferred user (86). For example, preferred user module 38 may query user profile data store (UPD) 42 to determine whether user 25 is a preferred user as described herein with respect to FIG. 1. If user 25 is not a preferred user ("NO" branch of 86), communication server 34 may reject the request to join communication session 40 (88).

If user 25 is determined to be a preferred user ("YES" brand of 84), communication server 34 may send a notification to a lead client device (e.g., client device that initiated communication session 40) with a permission request for user 25 to join communication session 40 (90). Communication server 34 may receive a response from the lead client device (92). If the permission request was not accepted by the user associated with the lead client device ("NO" branch of 94), communication server 34 may reject request to join communication session 40 (96). If the permission request was accepted by the user associated with the lead client device ("YES" branch of 94), communication server 34 may connect preferred user to communication session 40 (98). For example, session module 36 may send a message to client device 10 enabling communication client 12 to couple to communication session 40.

In some examples, sending the notification to the lead client device may be optional. In that instance, once the user is determined to be the preferred user, session module 36 may send a message to client device 10 enabling communication client 12 to couple to communication session 40. In some examples, communication session 40 may be a public communication session or a private communication session. For example, public communication sessions may allow any user to join the communication session. Thus, if user 25 is attempting to join a public communication session that is full, session module 36 may not send the notification to the lead client device. In some examples, private communications sessions have a set group of contacts or users that may join the communication session. In some examples, preferred users may attempt to join the private communication sessions. In that instance, the lead client device or all client devices coupled to the private communication session may be sent the notification with a permission request from the preferred user.

Example Interface

Figure 4:
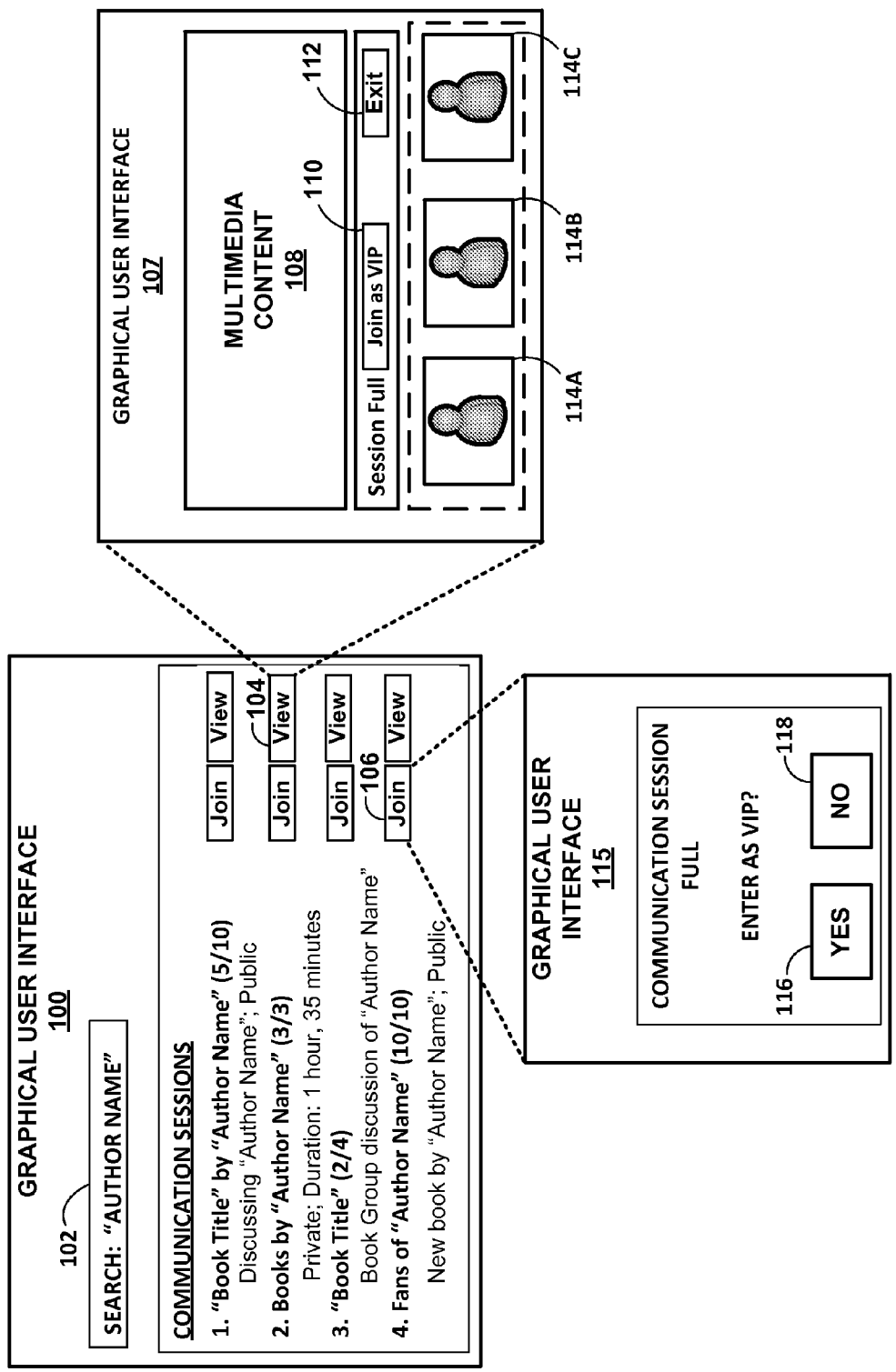
FIG. 4 is a block diagram illustrating an example of a graphical user interface for joining a communication session, in accordance with one or more aspects of the present disclosure.

FIG. 4 is a block diagram illustrating an example of a GUI for joining a communication session, in accordance with one or more aspects of the present disclosure. For purposes of illustration only, the example GUI is described below within the context of client device 10 as shown in FIG. 1.

Communication module 14 may cause output device 18 to display GUI 100. GUI 100 may include a search input box 102 and communication sessions. GUI 100 may enable a user (e.g., user 25) to search for communication sessions to join. For example, user 25 may search for communication sessions by entering a search term into search input box 102. As illustrated in FIG. 4, user 25 entered "Author Name" into search input box 102. In response to entering the search term, session module 36 may query established communication sessions and send a representation of one or more communication sessions that match the search term provided in text box 102.

GUI 100 may display a representation of one or more communication sessions that include the search term entered into search input box 102. For example, the representation may include a title, additional information, the number of client devices currently coupled to the communication session, and the maximum number of client devices of the one or more communication sessions.

As illustrated in FIG. 4, the one or more communication sessions may be displayed including the title of each communication session as well as any additional information. For example, GUI 100 includes four communication sessions. Each communication session includes a title "Book Title" by "Author Name") and additional information. In some examples, the additional information may include subject matter of the communication session, permissions (e.g., whether the communication session is public or private), a duration of the communication session, when the communication session was initiated, etc. In some examples, GUI 100 may display the number of client devices currently coupled to each communication session as well as the maximum number of client devices. For example, the first communication session is not full and has five client devices coupled to the communication session with a maximum number of client devices of ten (e.g., "5/10"). The second communication session listed is full and has three client devices coupled to the communication session with a maximum number of client devices of three (e.g., "3/3").

In some examples, GUI 100 may further display options to "join" 106 or "view" 104 the one or more communication sessions. Either or both of "join" 106 and "view" 104 may be selectable buttons, selectable links, etc. As illustrated in FIG. 4, if user 25 selects "join" 106, communication client 12 may display GUI 115. As illustrated in GUI 115, the communication session that user 25 selected to join has ten out of ten (e.g., "10/10") client devices coupled to the communication session. However, as illustrated in GUI 115, user 25 has been determined to be a preferred user and may select "Yes" 116 to couple to the full communication session as a preferred user (e.g., "enter as VIP"). User 25 may also select "No" 116, if user 25 does not want to join the communication session.

In other examples, user 25 may select "view" 104 to view the communication session prior to coupling to the communication session. As illustrated in FIG. 4, if user 25 selects "view" 104, communication client 12 may display GUI 107. In some examples, user 25 may view the communication session anonymously. That is, the other users participating in the virtual collaboration session are not aware that user 25 is viewing the virtual collaboration session. In some examples, the viewing may be limited to public communication sessions. As user 25 views the communication session, GUI 107 may receive and output multimedia content 108 and video feeds 114A-C of users coupled to the communication session. Additionally, client device 10 may receive may output the audio feeds of the users. However, the video feed and audio feed of user 25 is not sent to the other client devices coupled to the communication session while user 25 is viewing the communication session. In that way, the preferred user (e.g., user 25) may anonymously view the communication session to determine whether or not he or she wants to join the communication session. As illustrated in FIG. 4, GUI 100-1 may display options for user 25 to "Join as VIP" 110 or "Exit" 112. If user 25 selects "Join as VIP", user 25 may couple to the full communication session as described herein. If user 25 selects "Exit" 113, communication module 14 may display GUI 100.

Example Process

Figure 5:
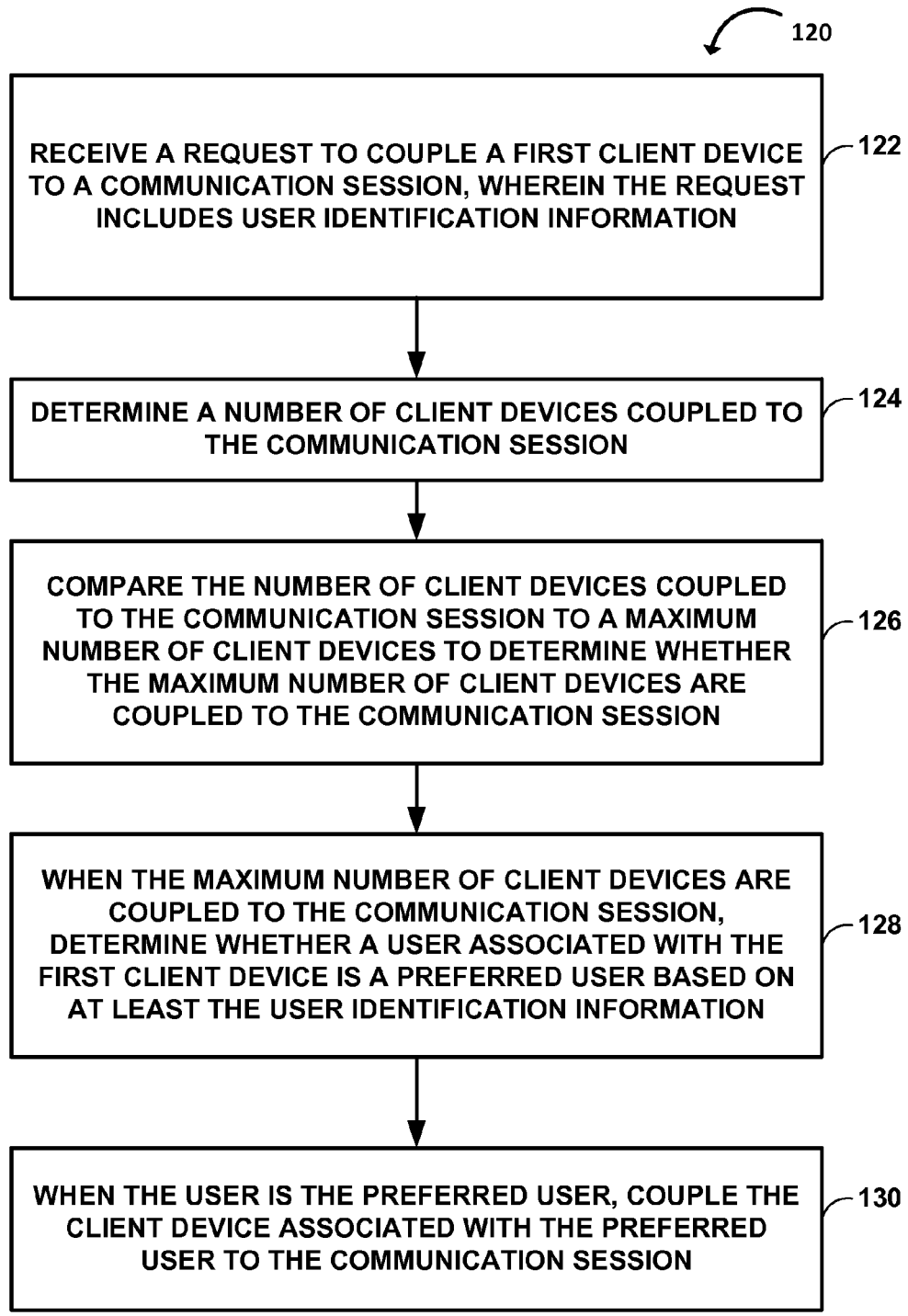
FIG. 5 is a flow diagram illustrating an example process for joining a client device to a communication session, in accordance with one or more aspects of this disclosure.

FIG. 5 is a flow diagram illustrating an example process 120 for joining a client device to a communication session, in accordance with one or more aspects of this disclosure. For purposes of illustration only, the example process is described below within the context of communication server 34 of server device 32 as shown in FIG. 1.

Process 120 may include receiving, by one or more computing devices, a request to couple a first client device to a communication session, wherein the request includes user identification information (122). For example, communication server 34 may receive a request to join communication session 40 from client device 10 as described above with respect to FIG. 1. Process 120 may include determining, by the one or more computing devices, a number of client devices coupled to the communication session (124). For example, session module 36 may determine the number of client devices coupled to communication session (e.g., client devices 46A-C). Process 120 may further include comparing, by the one or more computing devices, the number of client devices coupled to the communication session to a maximum number of client devices to determine whether the maximum number of client devices are coupled to the communication session (126). For example, session module 36 may compare the number of client devices coupled to communication session 40 to a maximum number of client devices of communication session 40.

The process 120 may include when the maximum number of client devices are coupled to the communication session, determining, by the one or more computing devices, whether a user associated with the first client device is a preferred user based on at least the user identification information (128). For example, session module 36 may determine communication session 40 is full (e.g., has the maximum number of client devices) and send a message to preferred user module 38 to determine whether user 25 associated with client device 10 is a preferred user as described above with respect to FIG. 1. When the user is the preferred user, process 120 may include coupling, by the one or more computing devices, the client device associated with the preferred user to the communication session (130). For example, preferred user module 38 may send a message to session module 36 indicating user 25 is a preferred user and session module 36 may send a message to client device 10 enabling communication client 12 to couple to communication session 40. Communication session 40 may enable communication between the first client device (e.g., client device 10) and one or more second client devices (e.g., client devices 46) coupled to communication session 40.

In some examples, determining whether the user associated with the first client device is the preferred user may further include querying, by the one or more computing devices, at least one data store based on at least the user identification information to retrieve user status information for the user associated with the first client device. For example, preferred user module 38 may query UPD 42 using the user identification information to retrieve user status information regarding user 25 associated with client device 10. The method may include determining a user status of the user associated with the first client device based at least in part on the retrieved user status information, where the user status is one of the preferred user and a non-preferred user. For example, a user status of user 25 associated with client device 10 may be determined based on the retrieved user status. In some examples, the preferred user has at least one of a granted preferred status and a verified preferred status. In some examples, the granted preferred status has a limited duration. The limited duration may be based on at least one of a time limit, a number of connections to communication sessions, and an activity level.

In some examples, when the user is a non-preferred user, process 120 may include rejecting, by the one or more computing devices, the request to couple to the communication session from the first client device associated with the non-preferred user. For example, upon preferred user module 38 determining user 25 is a non-preferred user, preferred user module 38 may send session module 36 a message indicating user 25 is a non-preferred user and session module 36 may reject the request to join communication session 40.

Process 120 may include, when fewer than the maximum number of client devices are coupled to the communication session, coupling, by the computing device, the first client device to the communication session. For example, if fewer than the maximum number of client devices are coupled to communication session 40, session module 36 may send a message to client device 10 enabling client device 10 to couple to communication session 40. In the example where fewer than the maximum number of client devices are coupled to communication session 40, the first client device may be associated with a preferred user or a non-preferred user (e.g., before the maximum number of client devices for the session is reached, client devices may be coupled to the communication session regardless of whether the associated use is preferred or non-preferred).

Process 120 may further include receiving, by the one or more computing devices, a configuration request from one of the one or more second client devices to set the maximum number of client devices of the communication session. In some examples, the second client device that sends the configuration request is the client device that initiated the communication session (e.g., a lead client device). For example, server device 32 may receive a configuration request from client device 46A including the maximum number of client devices for communication session 40. In one example, client device 46A is the second client device (e.g., the client device that initiated communication session 40).

When the maximum number of client devices are coupled to the communication session and when the user associated with the first client device is the preferred user, process 120 may include sending, by the one or more computing devices, a notification of the request to the second client device that sent the configuration request (e.g., client device 46A) indicating the request to join from client device 10. In some examples, the notification includes a permission request for the first client device associated with the preferred user to couple to the communication session. Process 120 may include receiving, by the one or more computing devices, a response to the notification from the second client device that sent the configuration request indicating whether the first client device associated with the preferred user has permission to join the communication session. Process 120 may include, when the user is the preferred user, sending, by the one or more computing devices, a message to the one or more second client devices coupled to the communication session indicating that the preferred user has been coupled to the communication session.

In some examples, the user identification information includes a first identifier of the first client device that sent the request and a second identifier of the user associated with first client device. That is, the request received by session module 36 may include an identifier of client device 10 and an identifier of user 22.

Additionally, process 120 may include receiving, by the one or more computing devices, a request to obtain a verified preferred status, verifying, by the one or more computing devices, that the user associated with the first client device is the preferred user, and storing, by the one or more computing devices, the verified preferred status of the user within at least one data store. For example, the verified preferred status of user 25 may be stored in user profile data store 42. In some examples, the verified preferred status indicates that a social network service provider associated with the communication session has authenticated the user as the preferred user.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

In some examples, any of the described software units, modules or components may be executed as one or more distributed processes on one or more computing devices of a distributed system. In this way, workloads of any of the described software units, modules or components may be distributed across the distributed system for processing. In one example, a distributed system may include multiple autonomous computers that communicate through one or more communication channels, such as a computer network, to perform techniques implemented by the software units, modules or components.

Various embodiments have been described. These and other embodiments are within the scope of the following claims.

The invention claimed is:

1. A method, executing on one or more computing devices, the method comprising:
   receiving, by the one or more computing devices, a request to designate verified preferred status of a user;
   designating verified preferred status by updating a profile of the user to include the verified preferred status;
   receiving, by the one or more computing devices, a request to couple a first client device to a communication server including a communication session, wherein the request includes user identification information that includes a first identifier of the first client device that sent the request and a second identifier of a user associated with the first client device;
   determining, by the one or more computing devices, a number of client devices coupled to the communication session;
   comparing, by the one or more computing devices, the number of client devices coupled to the communication session to a maximum number of client devices to determine whether the maximum number of client devices are coupled to the communication session;
   when fewer than the maximum number of client devices are coupled to the communication session, coupling, by the one or more computing devices, the first client device to the communication session;
   when the maximum number of client devices are coupled to the communication session, determining, by the one or more computing devices, whether the user associated with the first client device is a verified preferred user based on at least the user identification information by:
      querying, by the one or more computing devices, at least one data store based on at least the user identification information to retrieve user status information for the user associated with the first client device; and
      determining, by the one or more computing devices, a user status of the user associated with the first client device based at least in part on the retrieved user status information;
   when the user is determined to be a verified preferred user and the maximum number of client devices are coupled to the communication session, coupling, by the one or more computing devices, the first client device to the communication session even though the maximum number of client devices are coupled to the communication session, wherein the communication session enables communication between the first client device and one or more additional client devices coupled to the communication session;
   sending, by the one or more computing devices, a notification to at least one of the one or more additional client devices indicating the request to join; and
   when the user is determined not to be a verified preferred user, rejecting, by the one or more computing devices, the request to couple the first client device to the communication session.

2. A method, executing on one or more computing devices, the method comprising:
   receiving, by the one or more computing devices, a request to designate verified preferred status of a user;
   designating verified preferred status by updating a profile of the user to include the verified preferred status;
   receiving, by the one or more computing devices, a request to couple a first client device to a communication server including a communication session, wherein the request includes identification information that includes a first identifier of the first client device and a second identifier of a user associated with the first client device;
   determining, by the one or more computing devices, a number of client devices coupled to the communication session;
   comparing, by the one or more computing devices, the number of client devices coupled to the communication session to a maximum number of client devices to determine whether the maximum number of client devices are coupled to the communication session;
   when fewer than the maximum number of client devices are coupled to the communication session, coupling, by the one or more computing devices, the first client device to the communication session;

when the maximum number of client devices are coupled to the communication session; determining, by the one or more computing devices, whether the user associated with the first client device is a verified preferred user based on at least the identification information by:
  querying, by the one or more computing devices, at least one data store based on at least the identification information to retrieve user status information for the user associated with the first client device; and
  determining, by the one or more computing devices, a user status of the user associated with the first client device based at least in part on the retrieved user status information;
when the user is determined to be a verified preferred user and the maximum number of client devices are coupled to the communication session, coupling, by the one or more computing devices, the first client device associated with the verified preferred user to the communication session even though the maximum number of client devices are coupled to the communication session, wherein the communication session enables communication between the first client device and one or more additional client devices coupled to the communication session;
sending, by the one or more computing devices, a notification to at least one of the one or more additional client devices indicating the request to join; and
when the user is not a verified preferred user, rejecting, by the one or more computing devices, the request to couple the first client device to the communication session.

3. The method of claim 2, further comprising receiving, by the one or more computing devices, a configuration request from one of the one or more additional client devices to set the maximum number of client devices of the communication session.

4. The method of claim 3, further comprising, when the maximum number of client devices are coupled to the communication session and when the user associated with the first client device is determined to be a verified preferred user, sending, by the one or more computing devices, a notification to the one of the one or more additional client devices that sent the configuration request indicating the request to join.

5. The method of claim 4, wherein the notification includes a permission request for the first client device to couple to the communication session.

6. The method of claim 5, further comprising receiving, by the one or more computing devices, a response to the permission request indicating whether the first client device has permission to couple to the communication session.

7. The method of claim 2, further comprising, when the user is the verified preferred user, sending, by the one or more computing devices, a message to the one or more additional client devices coupled to the communication session indicating that the first client device has coupled to the communication session.

8. The method of claim 2, wherein the request to couple the first client device includes a user profile identifier.

9. The method of claim 8, wherein the second identifier of the user associated with first client device comprises the user profile identifier.

10. The method of claim 2, further comprising:
  verifying, by the one or more computing devices, that the user associated with the first client device is a verified preferred user; and
  storing, by the one or more computing devices, the verified-preferred status of the user in the at least one data store.

11. A non-transitory computer-readable storage medium comprising instructions that, when executed, cause one or more processors of one or more computing devices to perform operations comprising:
  receiving, by the one or more computing devices, a request to designate verified preferred status of a user;
  designating verified preferred status by updating a profile of the user to include the verified preferred status;
  receiving, by the one or more computing devices, a request to couple a first client device to a communication server including a communication session, wherein the request includes identification information that includes a first identifier of the first client device and a second identifier of the user associated with the first client device;
  determining, by the one or more computing devices, a number of client devices coupled to the communication session;
  comparing, by the one or more computing devices, the number of client devices coupled to the communication session to a maximum number of client devices to determine whether the maximum number of client devices are coupled to the communication session;
  when fewer than the maximum number of client devices are coupled to the communication session, coupling, by the one or more computing devices, the first client device to the communication session;
  when the maximum number of client devices are coupled to the communication session, determining, by the one or more computing devices, whether the user associated with the first client device is a verified preferred user based on at least the identification information by:
    querying, by the one or more computing devices, at least one data store based on at least the identification information to retrieve user status information for the user associated with the first client device; and
    determining, by the one or more computing devices, a user status of the user associated with the first client device based at least in part on the retrieved user status information; and
  when the user is determined to be a verified preferred user and the maximum number of client devices are coupled to the communication session, coupling, by the one or more computing devices, the first client device associated with the verified preferred user to the communication session even though the maximum number of client devices are coupled to the communication session, wherein the communication session enables communication between the first client device and one or more additional client devices coupled to the communication session;
  sending, by the one or more computing devices, a notification to at least one of the one or more additional client devices indicating the request to join; and
  when the user is not a verified preferred user, rejecting, by the one or more computing devices, the request to couple the first client device to the communication session.

12. The non-transitory computer-readable storage medium of claim 11, wherein the request to couple the first client device includes a user profile identifier.

13. The non-transitory computer-readable storage medium of claim 12, wherein the second identifier of the user associated with first client device comprises the user profile identifier.

14. The non-transitory computer-readable storage medium of claim 11, wherein the operations further comprise, receiving, by the one or more computing devices, a configuration request from one of the one or more additional client devices to set the maximum number of client devices of the communication session.

15. The non-transitory computer-readable storage medium of claim 14, wherein the operations further comprise, when the maximum number of client devices are coupled to the communication session and when the user associated with the first client device is determined to be the verified preferred user, sending, by the one or more computing devices, a notification to the one of the one or more additional client devices that sent the configuration request indicating the request to join.

16. The non-transitory computer-readable storage medium of claim 15, wherein the notification includes a permission request for the first client device to couple to the communication session.

17. The non-transitory computer-readable storage medium of claim 16, wherein the operations further comprise, receiving, by the one or more computing devices, a response to the permission request indicating whether the first client device has permission to couple to the communication session.

18. The non-transitory computer-readable storage medium of claim 11, wherein the operations further comprise, when the user is the verified preferred user, sending, by the one or more computing devices, a message to the one or more additional client devices coupled to the communication session indicating that the first client device associated with the verified preferred user has coupled to the communication session.

19. The non-transitory computer-readable storage medium of claim 11, wherein the operations further comprise verifying, by the one or more computing devices, that the user associated with the first client device is a verified preferred user.

20. The non-transitory computer-readable storage medium of claim 19, wherein the operations further comprise storing, by the one or more computing devices, the verified preferred status of the user in the at least one data store.

* * * * *